United States Patent [19]

Kilmoyer

[11] Patent Number: 4,635,670
[45] Date of Patent: Jan. 13, 1987

[54] HEAT SENSITIVE VALVE

[75] Inventor: James E. Kilmoyer, Houston, Tex.

[73] Assignee: Cameron Iron Works, Inc., Houston, Tex.

[21] Appl. No.: 805,703

[22] Filed: Dec. 6, 1985

[51] Int. Cl.[4] .............................................. F16K 17/14
[52] U.S. Cl. ........................................ 137/75; 137/79; 251/66
[58] Field of Search ...................... 137/72, 75, 76, 79; 251/66

[56] References Cited

U.S. PATENT DOCUMENTS

| | | | |
|---|---|---|---|
| 901,197 | 10/1908 | Schwager | 137/75 |
| 1,614,002 | 1/1927 | Horton | 137/72 |
| 2,008,961 | 7/1935 | Lessard | 137/72 |
| 4,143,671 | 3/1979 | Olson | 137/72 |

Primary Examiner—Harold W. Weakley
Attorney, Agent, or Firm—Vinson & Elkins

[57] ABSTRACT

A heat sensitive valve including a body having an inlet, an outlet, a valve chamber and a valve seat surrounding the opening between the inlet and the outlet, a bonnet connected to the body with a bore therethrough in communication with the valve chamber, a valve member positioned in said valve chamber and coacting with said valve seat to open and close flow through said valve, a stem connected to said valve member extending through the bore of said bonnet, a pressure responsive actuator connected to said stem with means of supplying and venting pressure fluid to an from said actuator, a housing secured to the bonnet, a linkage supported by said housing in an extended position, having means for engaging the outer end of the stem, heat sensitive means for retaining the linkage in its extended position supporting the stem and means biasing the linkage away from its extended position when said heat sensitive means releases the linkage to thereby remove support retaining said valve member in its innermost position.

11 Claims, 4 Drawing Figures

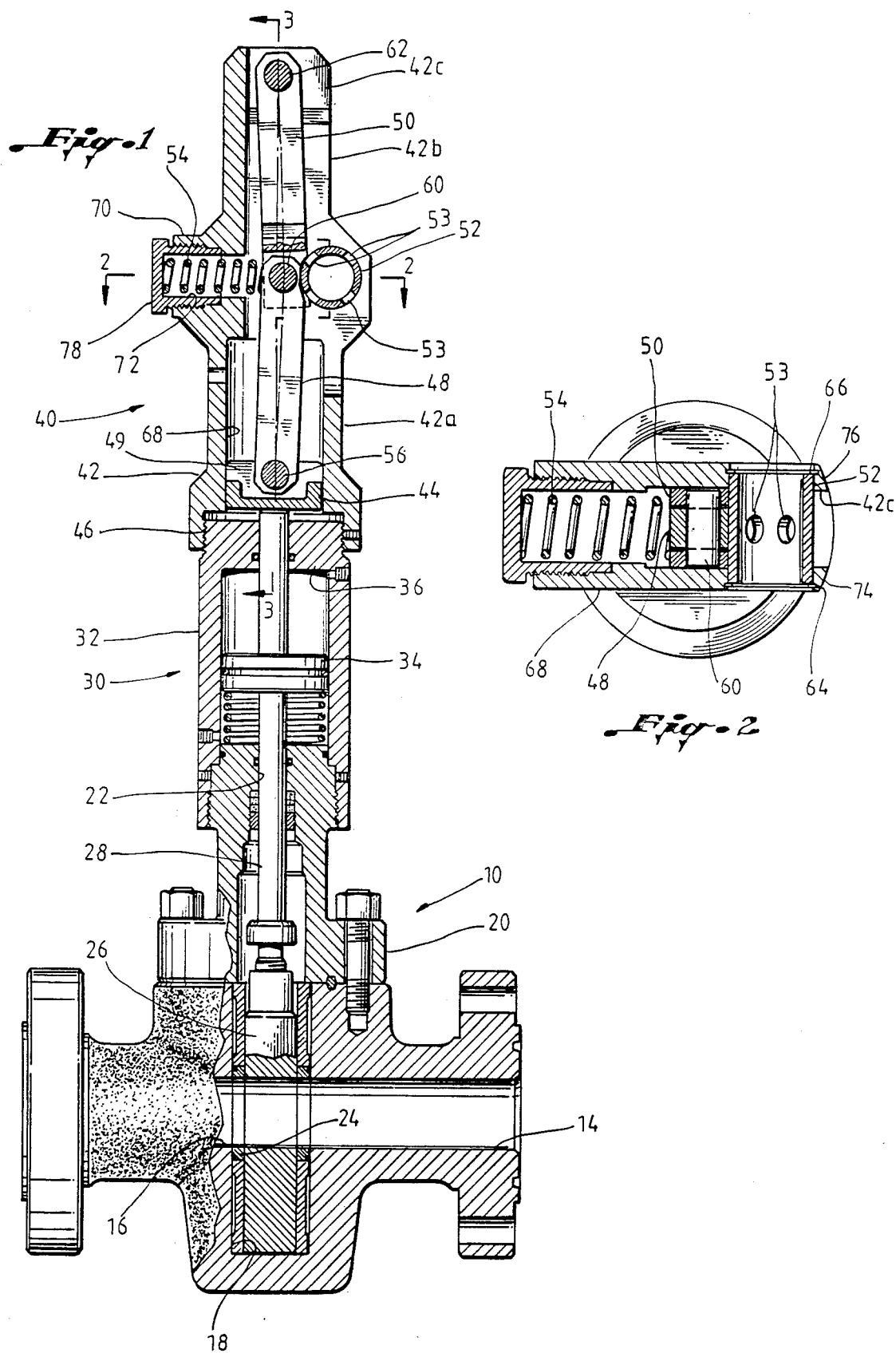

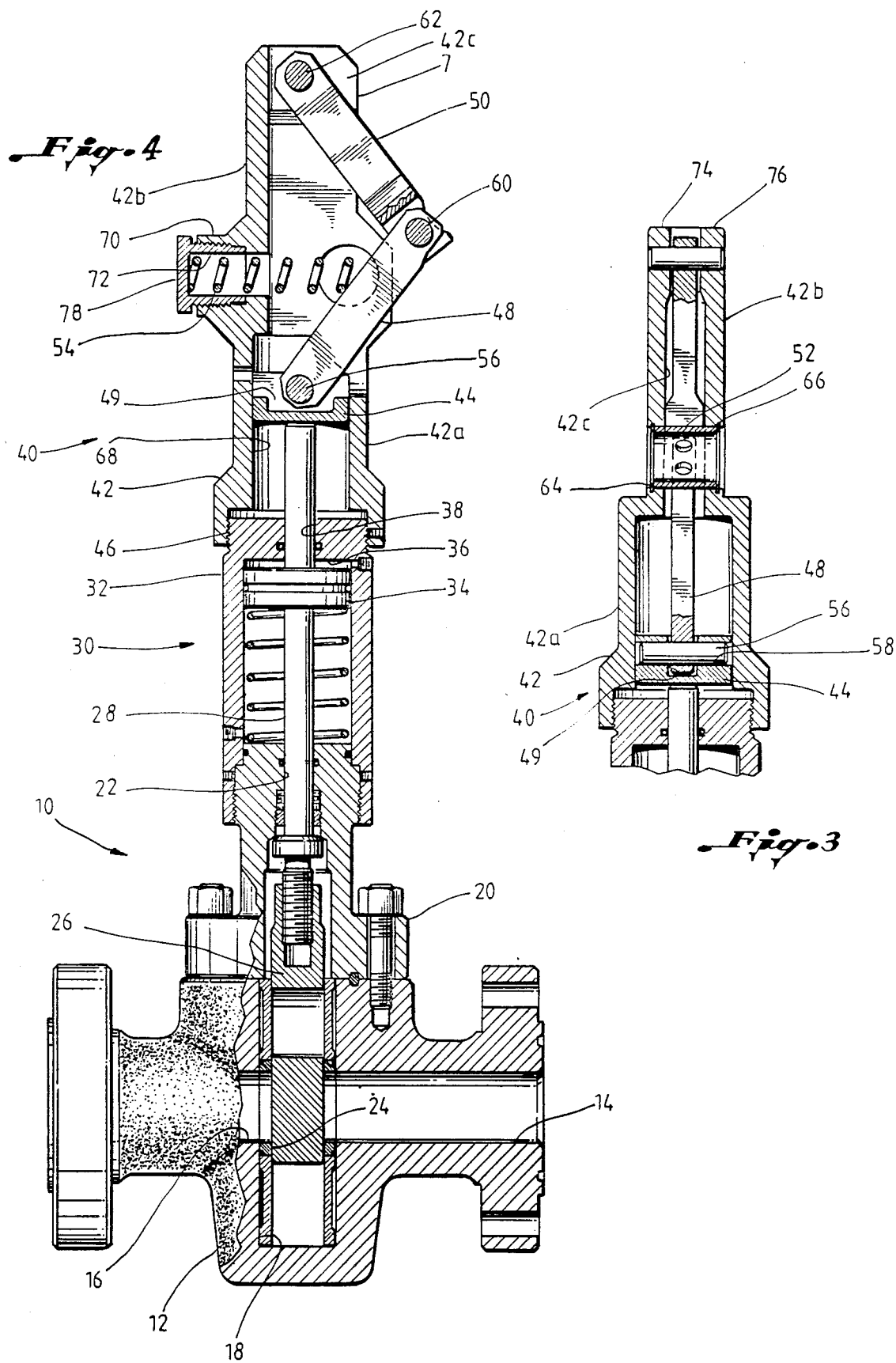

HEAT SENSITIVE VALVE

The present invention relates to an improved valve having a pressure responsive actuator which moves its valve member and its attached stem between open and closed positions. Such valves are commonly used in workovers on oil and gas wells and they are installed and actuated to their open position when work is to proceed on the well. The valve is intended to be heat responsive so that if a fire occurs, the valve will close to protect against the well fluids being exposed to the fire. As often happens, it is not desirable that the valve creep closed during its use as can happen with prior heat sensitive valves which rely on eutectic materials which when loaded with the pressure forces from the well bore on the stem.

While prior devices have been used wherein a heat sensitive material is utilized to support the stem so that the valve remains in its desired position with the support of the heat sensitive material but such materials are often not sufficiently strong to resist a continuing force resulting from the pressure on the stem causing creep of the heat sensitive material. The A. S. Volpin U.S. Pat. No. 2,647,721; the H. Allen U.S. Pat. No. 2,973,776; the Kelly U.S. Pat. Nos. 3,659,624 and 3,842,853; the L. Williams U.S. Pat. No. 4,214,600; and the Bruton U.S. Pat. No. 4,421,134 discloses a rising stem gate valve having a long supporting sleeve of fusible material supporting the valve in its innermost position wherein all of the material must melt to allow the valve member to move to its uppermost (or closed) position and to allow the stem shoulder to back seat on the seat surrounding the bonnet bore. Such sleeve has to be at least the length of the stroke of the valve plus the distance to move the valve stem to its back seating position.

A gate valve having a rising stem with a cap having a sleeve of fusible material supporting the stem. The fusible sleeve is of sufficient length to allow the stem to move a sufficient distance so that the gate is moved to its outer position and the stem also backseats on the bonnet. The disadvantage of such structure is that it may be subject to creep and also the entire sleeve has to melt or vaporize for the complete movement of the stem. Also, the sleeve may be subject to creep under ambient conditions of high temperature less that the preselected fusible release temperature

SUMMARY

The present invention relates to a rising stem valve which is actuated responsive to pressure, is normally open and locked in the open position but is heat responsive so that when it is exposed to a fire it moves to its closed position.

The valve includes a body having an inlet, an outlet, a valve chamber and a valve seat surrounding the opening between the inlet and the outlet, a bonnet connected to the body with a bore therethrough in communication with the valve chamber, a valve member positioned in said valve chamber and coacting with said valve seat to open and close flow through said valve, a stem connected to said valve member extending through the bore of said bonnet, a pressure responsive actuator connected to said stem with means of supplying and venting pressure fluid to and from said actuator, a housing secured to the bonnet, a linkage supported by said housing in an extended position, having means for engaging the outer end of the stem, heat sensitive means for retaining the linkage in its extended position supporting the stem and means biasing the linkage away from its extended position when said heat sensitive means releases the linkage to thereby remove support retaining said valve member in its innermost position.

An object of the present invention is to provide an improved rising stem valve which can be positioned in its open position during use of the valve but which will close responsive to heat without problems of partial closing.

Another object is to provide an improved heat sensitive rising stem valve held in open position by heat sensitive material which is used so that it allows quick and positive release of the valve to move to its closed position.

A further object of the present invention is to provide an improved heat sensitive rising stem valve held in open position by heat sensitive material which is not subject to premature closing or creep.

BRIEF DESCRIPTION OF THE DRAWINGS

These and other objects and advantages of the present invention are hereinafter set forth and explained with reference to the drawings wherein:

FIG. 1 is a partial longitudinal sectional view of the improved heat sensitive valve of the present invention.

FIG. 2 is a transverse sectional view through the heat release device taken along line 2—2 in FIG. 1.

FIG. 3 is a sectional view of the heat release device taken along line 3—3 in FIG. 1.

FIG. 4 is view similar to FIG. 1 but illustrating the release of the heat release device.

DESCRIPTION OF THE PREFERRED EMBODIMENT

Improved gate valve 10 of the present invention includes body 12 having inlet 14 and outlet 16 communicating with chamber 18. Bonnet 20 is secured to body 12 and has bore 22 extending therethrough and in communication with chamber 18. Valve seat 24 surrounds the opening of outlet 16 into chamber 18. Valve member 26 is positioned in valve chamber 18 and is connected to valve stem 28 which extends through bore 22 of bonnet 20. Actuator 30 is connected to bonnet 20 and stem 28 and functions to move valve member 26 between positions opening and closing flow through valve seat 24. Actuator 30 includes tubular housing 32 which is secured on the outer end of bonnet 20 and piston 34 positioned within housing 32 for reciprocation responsive to pressures within housing 32 on opposite sides thereof. Piston 34 is secured to stem 28 and the movement of piston 34 causes movement of stem 28 and valve member 26. The outer end of housing 32 is closed by end member 36 which is shown to be integral with housing 32 but may be a separate member. End member 36 has bore 38 through which the outer end of stem 28 extends in sealed relationship.

Heat responsive or heat sensitive device or cap 40 is secured to the outer end of actuator housing 32 as shown and includes housing 42, the inner portion 42a of which is tubular and the outer portion 42b of which is flat and includes axially extending slot 42c. Stem follower 44 is positioned within inner housing portion 42a in normally in abutting relationship to the outer end of stem 28. Device 40 functions to provide a heat sensitive support after valve member 26 has been moved to its innermost or open position as shown in FIG. 1 to retain stem 28 and valve member 26 in such position. This is done by threading housing 42 onto the external threads 46 surrounding end member 36. Device 40 includes additionally links 48 and 50, heat responsive or fusible tube 52 and spring 54. Link 48 is secured within slot 49 in follower 44 by pin 56 which extends through link 48 and has its ends positioned in bore 58 through follower 44 as best seen in FIG. 3. The other end of link 48 is pivotally mounted to the inner end of link 50 by pin 60. The outer end of link 50 is pivotally secured in slot 42c to flat outer housing portion 42b by pin 62. Fusible tube 52 is suitably secured in supporting position in relation to links 48 and 50 by snap rings 64 and 66 which are positioned in grooves within housing portion 42b as best shown in FIG. 2. Fusible tube 52 includes radial openings 53 extending therethrough. Housing portion 42a has a generally tubular shape defining cylinder 68 in which follower 44 is positioned. The outer flat housing portion 42b includes hub 70 with bore 72 extending transversely through hub 70 and parallel flanges 74 and 76 extending away from hub 70 on either side of slot 42c which provides the opening in which connected links 48 and 50 are positioned and can pivot to allow follower 44 and stem 28 to move. Spring 54 is positioned in bore 72 and its outer end is supported in cap closure 78 and its inner end is against the inner surfaces of links 48 and 50 to bias such links toward tube 52.

It should be noted that links 48 and 50, when installed and in operating position, do not extend to a past center position as clearly shown in FIG. 1. The side of link 50 engaging tube 52 is concave and has the shape of the exterior of tube 52 so that there is a substantial surface engagement between link 50 and tube 52. Also, the upper and lower surfaces of the yoke portion of link 50 are slidable on the inner surfaces of flanges 74 and 76. With this particular structure the engagement of link 50 with tube 52 and the position of tube 52 in flanges 74 and 76 places tube 52 in shear with substantially no other stresses which would materially cause its ultimate failure. Link 48 is shaped to avoid contact with tube 52 and thus, avoid introducing bending moment forces in tube 52 which could vary the desired release temperature and time for release.

The material of tube 52 is selected to fail in shear at a preselected temperature at which valve member 26 is to move to its closed position Once tube 52 is subjected to such preselected temperature it no longer provides sufficient force to prevent movement of links 48, 50 and they move allowing follower 44 to move, all as shown in FIG. 4. A typical preferred material is a polycarbonate having a fusing temperature less than 400° F. (204° C.). A preferred material is the polycarbonate marketed by General Electric Company and sold under the trademark "Lexan" including the grades 101 and 1500. "Lexan 101" grade resin is a high viscosity material having a softening temperature between 305° and 315° F. (152°–157° C.) and which melts between 330° and 350° F. (166°–177° C.). "Lexan 1500" grade resin has a softening temperature between 310° and 310° F. (154°–160° C.) and melts at approximately 340° F. (171° C.). Other suitable materials, which melt at the preselected temperature and which allow the shear release of release device 40 at the preselected temperatures and within the allowable period of time as set out in the API 14D may be used for tube 52. Silver solder type of fusible material has been found to be unsatisfactory due to crumbling when exposed to the shear loads of device 40.

API Spec. 14D relates to wellhead surface safety valves for offshore service and includes section 2.4 on "Heat Sensitive Lockopen Devices". This section sets forth that the device shall maintain the valve open at atmospheric temperatures up to 150° F. (66° C.) with the valve body pressurized to its maximum rated working pressure and the actuator bled to atmospheric conditions. This section also specifies that the device shall allow the valve to close under actuator forces alone (no pressure in the body or actuator) within six minutes after being subjected to a controlled environmental temperature of 1000° F. (538° C.). Also it should be designed to actuate at a maximum sustained temperature of 400° F. (204° C.).

The improved structure of the present invention is designed to meet such API specifications and in lab tests has met such specifications.

In a heat sensitive device of the present invention, a typical tube 52 would have an outer diameter of two and one-half inches, a bore of two inches and a length of 2.94 inches. With such tube, springs 54 having an initial load on linkage 48, 50 of 300 pounds to ensure movement of the linkage on exposure of the device 40 to maximum temperature of 400° F. (204° C.).

What is claimed is:

1. A heat sensitive valve comprising
a body having an inlet, an outlet and a valve chamber therebetween with a valve seat in said valve chamber surrounding the opening of one of said inlet and said outlet into said valve chamber,
a valve member movably positioned in said chamber to coact with said seat to open and close flow through said valve,
a bonnet secured to said body and having an opening therethrough,
a valve stem connected to said valve member and extending through said bonnet opening,
means connected to said stem for actuating said valve member to its open and closed positions,
linkage means engaging and supporting the outer end of said valve stem in its innermost position, and
heat responsive means retaining said linkage means in said stem supporting position,
said heat responsive means upon exposure to excessive heat releases said linkage to remove support of said valve stem allowing outward movement thereof to close flow through said valve,
said linkage means in its supporting position extending to an almost straight position and said heat responsive means including
a heat sensitive tube engaging said linkage means with its exterior cylindrical surface to retain said linkage means in its extended position and when subjected to elevated temperatures above a preselected temperature said tube releases said linkage means to allow it to pivot and the valve member to move to its outermost position.

2. A valve according to claim 1 including
means biasing said linkage against said tube.

3. A valve according to claim 1 wherein
said linkage means includes a pair of links having their adjacent ends pivotally connected to each other, one end of one link being pivotally connected to a movable member engaging the outer end of said valve stem and the outer end of the other link being pivotally connected to a housing connected to said actuating means.

4. A valve according to claim 1 wherein the material of said heat sensitive tube is a polycarbonate having a softening temperature between 305° and 320° F.

5. A valve according to claim 2 wherein
- one of said links is shaped to fit closely against the exterior of said heat sensitive tube and the other of said links is shaped to prevent its engagement of the exterior surface of the heat sensitive tube.

6. As a subcombination with a pressure actuated rising stem valve having a pressure responsive actuator connected to move the valve member and having a stem extending outwardly therefrom, of a heat sensitive stem retaining device comprising
- a housing adapted to connect to the valve actuator,
- a follower positioned in said housing for engagement with the outer end of said stem and being slidable therein,
- a pair of interconnected links having their adjacent ends pivotally connected to each other, one end of one link being pivotally connected to said follower and the outer end of the other link being pivotally connected to said housing, said links connecting from said housing to said follower to support said follower in its position retaining the stem in its inward position,
- a heat sensitive tube engaging said linkage means with its exterior cylindrical surface to retain said links in their extended position and when subjected to elevated temperatures above a preselected temperature, said tube releases said links to allow them to pivot and allow said follower to move from its stem retaining position, and
- means biasing said linkage toward said heat sensitive tube.

7. The subcombination according to claim 6 wherein said heat sensitive tube is exposed substantially only to shearing forces by said linkage.

8. The subcombination according to claim 6 wherein
- said heat sensitive tube is a polycarbonate material having a softening temperature in the range from 305° to 320° F. and of sufficient thickness and strength to avoid premature failure until exposed to temperatures above 150° F.

9. The subcombination according to claim 6 wherein the means biasing said linkage toward said heat sensitive is a spring.

10. The subcombination according to claim 6 wherein said linkage is positioned toward said heat responsive means from a dead center position.

11. The subcombination according to claim 6 wherein
- one of said links is shaped to fit closely against the exterior of said heat sensitive tube and the other of said tubes is shaped to prevent its engagement of the exterior surface of the heat sensitive tube.

* * * * *

UNITED STATES PATENT AND TRADEMARK OFFICE
CERTIFICATE OF CORRECTION

PATENT NO. : 4,635,670
DATED : January 13, 1987
INVENTOR(S) : James E. Kilmoyer

It is certified that error appears in the above—identified patent and that said Letters Patent is hereby corrected as shown below:

Column 1, line 46, delete "that" and insert therefor -- than --.

Column 1, line 37, delete "A" and insert therefor -- In a --.

Column 1, line 38, delete "stem. The" and insert therefor -- stem, the --.

Column 1, line 47, delete the period (.) after "temperature".

Column 2, line 31, after "4 is", insert -- a --.

Column 3, line 46, insert a period (.) after "position".

Column 3, line 59, delete "between 310 and 310°F" and insert therefor -- between 310 and 320°F --.

Claim 9, line 2, after "sensitive", insert -- tube --.

Signed and Sealed this

Tenth Day of November, 1987

Attest:

DONALD J. QUIGG

*Attesting Officer*     *Commissioner of Patents and Trademarks*